(12) United States Patent
Liu et al.

(10) Patent No.: US 10,484,967 B2
(45) Date of Patent: Nov. 19, 2019

(54) COMMUNICATION METHOD, NETWORK DEVICE, AND TERMINAL DEVICE

(71) Applicant: Huawei Technologies Co., Ltd., Shenzhen, Guangdong, P.R. (CN)

(72) Inventors: Shuai Liu, Shanghai (CN); Zhulin Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/252,461

(22) Filed: Jan. 18, 2019

(65) Prior Publication Data

US 2019/0174458 A1 Jun. 6, 2019

Related U.S. Application Data

(63) Continuation of application No. PCT/CN2016/090835, filed on Jul. 21, 2016.

(51) Int. Cl.
*H04W 68/00* (2009.01)
*H04W 68/02* (2009.01)
*H04W 8/18* (2009.01)
*H04W 48/18* (2009.01)
*H04W 72/12* (2009.01)

(52) U.S. Cl.
CPC .......... *H04W 68/02* (2013.01); *H04W 8/18* (2013.01); *H04W 48/18* (2013.01); *H04W 72/12* (2013.01)

(58) Field of Classification Search
CPC ..... H04W 68/02; H04W 48/18; H04W 72/12; H04W 8/18

USPC ......................................................... 455/458
See application file for complete search history.

(56) References Cited

U.S. PATENT DOCUMENTS

| | | | |
|---|---|---|---|
| 9,030,969 B2* | 5/2015 | Bennett | H04W 36/08 370/278 |
| 9,226,210 B1 | 12/2015 | Saleh et al. | |
| 9,295,096 B1* | 3/2016 | Shukla | H04W 84/12 |

(Continued)

FOREIGN PATENT DOCUMENTS

| | | |
|---|---|---|
| CN | 102404815 A | 4/2012 |
| CN | 103428673 A | 12/2013 |

(Continued)

*Primary Examiner* — Amancio Gonzalez
(74) *Attorney, Agent, or Firm* — Slater Matsil, LLP (57) ABSTRACT

A communication method and a terminal device are provided. The communication method includes: receiving, by a network device of a first communications standard, a suspension notification message sent by a terminal device, where the suspension notification message is used to notify that the terminal device is to leave a network of the first communications standard to listen to a network of a second communications standard, the network of the first communications standard carries data services, and the network of the second communications standard carries voice services; and suspending, by the network device according to the suspension notification message, sending scheduling information to the terminal device, and suspending detecting measurement information sent by the terminal device. The communication method, the network device, and the terminal device that are provided in the present disclosure can be used to save scheduling resources and avoid detection of an incorrect measurement quantity.

19 Claims, 5 Drawing Sheets

(56) References Cited

U.S. PATENT DOCUMENTS

| | | | |
|---|---|---|---|
| 9,723,033 B2* | 8/2017 | Chen | H04L 65/1069 |
| 9,763,153 B2* | 9/2017 | Vashi | H04W 36/14 |
| 10,075,936 B1* | 9/2018 | Edara | H04W 28/10 |
| 10,172,146 B2* | 1/2019 | Liu | H04W 72/1215 |
| 2010/0135206 A1* | 6/2010 | Cherian | H04W 36/0066 |
| | | | 370/328 |
| 2012/0198081 A1* | 8/2012 | Zhao | H04L 47/765 |
| | | | 709/227 |
| 2012/0207040 A1* | 8/2012 | Comsa | H04W 72/1215 |
| | | | 370/252 |
| 2013/0034082 A1* | 2/2013 | Etemad | H04W 36/14 |
| | | | 370/331 |
| 2013/0094446 A1 | 4/2013 | Swaminathan | |
| 2013/0208587 A1* | 8/2013 | Bala | H04W 16/14 |
| | | | 370/230 |
| 2014/0349646 A1* | 11/2014 | Su | H04W 76/16 |
| | | | 455/436 |
| 2015/0264703 A1* | 9/2015 | Ratasuk | H04W 16/14 |
| | | | 455/452.1 |
| 2015/0282237 A1* | 10/2015 | Su | H04W 76/16 |
| | | | 455/552.1 |
| 2015/0382285 A1* | 12/2015 | Anand | H04W 36/0061 |
| | | | 455/436 |
| 2016/0095152 A1* | 3/2016 | McDonnell | H04L 5/001 |
| | | | 370/294 |
| 2016/0095156 A1* | 3/2016 | Mitra | H04W 52/0241 |
| | | | 370/329 |
| 2016/0183240 A1 | 6/2016 | Hu et al. | |
| 2016/0309407 A1* | 10/2016 | Ngai | H04W 48/18 |
| 2016/0338133 A1* | 11/2016 | Lee | H04W 72/12 |

FOREIGN PATENT DOCUMENTS

| | | |
|---|---|---|
| CN | 103596269 A | 2/2014 |
| CN | 103703817 A | 4/2014 |
| CN | 103906192 A | 7/2014 |
| EP | 3026968 A1 | 6/2016 |
| WO | 2010048230 A2 | 4/2010 |

* cited by examiner

COMMUNICATION METHOD, NETWORK DEVICE, AND TERMINAL DEVICE

CROSS-REFERENCE TO RELATED APPLICATIONS

This application is a continuation of International Application No. PCT/CN2016/090835 filed on Jul. 21, 2016, the disclosure of which is hereby incorporated by reference in its entirety.

TECHNICAL FIELD

The present application relates to the communications field, and in particular, to a communication method, a network device, and a terminal device in the communications field.

BACKGROUND

As mobile communications head into a 3GPP Long Term Evolution (LTE) era, operators generally use LTE to carry data services, and use another communications standard, such as the Global System for Mobile Communications (GSM) or Code Division Multiple Access (CDMA), to carry voice services. As such, when transmitting/receiving a data service by using an LTE network, a 1T2R-type terminal may need to periodically or aperiodically leave the LTE network to listen to a paging channel of another communications standard, and transmit/receive a voice service by using the another communications standard. In this case, sending of all uplink and downlink scheduling information, detection of a physical uplink control channel (PUCCH) and a physical uplink shared channel (PUSCH), and the like in the LTE network still proceed as if in a normal case. Consequently, scheduling resources of a network device are wasted, and the network device may detect an incorrect measurement quantity after the terminal device leaves the network.

SUMMARY

The present disclosure provides a communication method, a network device, and a terminal device, to save scheduling resources of a network device and prevent the network device from detecting an incorrect measurement quantity.

According to a first aspect, the present disclosure provides a communication method, where the method includes:

receiving, by a network device of a first communications standard, a suspension notification message sent by a terminal device, where the suspension notification message is used to notify that the terminal device is to leave a network of the first communications standard to listen to a network of a second communications standard, the network of the first communications standard carries data services, and the network of the second communications standard carries voice services; and suspending, by the network device according to the suspension notification message, sending scheduling information to the terminal device, and suspending detecting measurement information sent by the terminal device.

According to the communication method provided in the present disclosure, after receiving the suspension notification message that is sent by the terminal device and used to indicate that the terminal device is to leave the network, the network device suspends sending scheduling information to the terminal device, and suspends detecting measurement information sent by the terminal device. This can save scheduling resources of the network device, prevent the network device from detecting an incorrect measurement quantity after the terminal device leaves the network, and therefore avoid impact on measurement accuracy because the terminal device uses the incorrect measurement quantity later after returning to the network of the first communications standard.

It should be understood that the terminal device in this embodiment of the present disclosure may be a 1T2R single active terminal device. 1T2R means that a transmitter of the terminal device has one transmit antenna, and that a receiver of the terminal device has two receive antennas. Single active means that the terminal device does not support concurrent services at a same time. That is, at a specific time, the terminal device either transmits/receives a data service in an LTE network, or transmits/receives a voice service in the network carrying voice services.

With reference to the first aspect, in a first possible implementation of the first aspect, the suspension notification message carries information about a manner of leaving the network of the first communications standard by the terminal device, and the manner information is used to indicate that the manner of leaving the network of the first communications standard by the terminal device is a periodic leaving manner or an aperiodic leaving manner; and the suspending, by the network device according to the suspension notification message, sending scheduling information to the terminal device, and suspending detecting measurement information sent by the terminal device includes: suspending, by the network device based on the manner information, sending scheduling information to the terminal device, and suspending detecting measurement information sent by the terminal device.

According to the communication method provided in the present disclosure, the network device uses a corresponding suspension manner, based on the manner information carried in the suspension notification message, to suspend sending scheduling information to the terminal device and suspend detecting measurement information sent by the terminal device. Therefore, the method has relatively high flexibility, and can be applied to application scenarios of different terminal device leaving manners.

With reference to the first possible implementation of the first aspect, in a second possible implementation of the first aspect, if the manner information indicates that the manner of leaving the network of the first communications standard by the terminal device is the periodic leaving manner, the suspending, by the network device based on the manner information, sending scheduling information to the terminal device, and suspending detecting measurement information sent by the terminal device includes: periodically suspending, by the network device based on the manner information, sending scheduling information to the terminal device, and periodically suspending detecting measurement information sent by the terminal device.

Optionally, the network device may, based on the manner information, periodically suspend sending scheduling information to the terminal device and periodically suspend detecting measurement information sent by the terminal device, from a start moment agreed upon in advance and based on suspension duration and a suspension interval that are agreed upon in advance.

With reference to the second possible implementation of the first aspect, in a third possible implementation of the first aspect, the suspension notification message further carries suspension start frame information, suspension interval information, and suspension duration information; and the periodically suspending, by the network device based on the manner information, sending scheduling information to the terminal device, and periodically suspending detecting measurement information sent by the terminal device includes: determining, by the network device, a plurality of suspension time segments based on the manner information, the start frame information, the suspension interval information, and the suspension duration information; and suspending, by the network device, sending scheduling information to the terminal device in the plurality of suspension time segments, and suspending, in the plurality of suspension time segments, detecting measurement information sent by the terminal device.

Optionally, in a time segment outside the plurality of suspension time segments, the network device may resume sending scheduling information to the terminal device, and resume detecting measurement information sent by the terminal device.

With reference to the first possible implementation of the first aspect, in a fourth possible implementation of the first aspect, if the manner information indicates that the manner of leaving the network of the first communications standard by the terminal device is the aperiodic leaving manner, and is a first aperiodic leaving manner in the aperiodic leaving manner, where the first aperiodic leaving manner indicates that the network device is requested to retain context information of the terminal device, the suspending, by the network device based on the manner information, sending scheduling information to the terminal device, and suspending detecting measurement information sent by the terminal device includes: suspending, by the network device based on the manner information, sending scheduling information to the terminal device, suspending detecting measurement information sent by the terminal device, and retaining the context information of the terminal device.

Optionally, after suspending sending scheduling information to the terminal device and suspending detecting measurement information sent by the terminal device, the network device may further receive a first resumption notification message sent by the terminal device. The first resumption notification message is used to notify that the terminal device has returned to the network of the first communications standard. Based on the first resumption notification message, the network device resumes sending scheduling information to the terminal device, and resumes detecting measurement information sent by the terminal device.

According to the communication method provided in the present disclosure, the network device learns, according to the suspension notification message and the resumption notification message that are sent by the terminal device, of a time at which the terminal device leaves the network and a time at which the terminal device returns to the network; and in a time segment in which the terminal device is absent from the network, suspends sending scheduling information to the terminal device, and suspends detecting measurement information sent by the terminal device. This can save scheduling resources, and improve accuracy in detecting measurement information by the network device after the terminal device returns to the network.

With reference to the first possible implementation of the first aspect, in a fifth possible implementation of the first aspect, if the manner information indicates that the manner of leaving the network of the first communications standard by the terminal device is the aperiodic leaving manner, and is a second aperiodic leaving manner in the aperiodic leaving manner, where the second aperiodic leaving manner indicates that the network device is requested to release context information of the terminal device, the suspending, by the network device based on the manner information, sending scheduling information to the terminal device, and suspending detecting measurement information sent by the terminal device includes: suspending, by the network device based on the manner information, sending scheduling information to the terminal device, suspending detecting measurement information sent by the terminal device, and releasing the context information of the terminal device.

Optionally, after receiving the suspension notification message, the network device sends a radio resource control RRC release request message to a mobility management entity MME, and enters an idle state.

According to the communication method provided in the present disclosure, the network device learns, according to the suspension notification message sent by the terminal device, that the terminal device is to be absent from the network for a long time because of triggering of a telephony service or the like, and the network device no longer maintains the terminal device. In this way, more terminal devices in need can be connected to the network device, thereby improving network resource utilization of the network device.

With reference to any one of the first aspect or the first to the fifth possible implementations of the first aspect, in a sixth possible implementation of the first aspect, before the receiving, by a network device of a first communications standard, a suspension notification message sent by a terminal device, the method further includes: sending, by the network device, indication information to the terminal device, where the indication information is used to indicate that the network device has a capability of recognizing a suspension notification message reported by any terminal device before the any terminal device leaves the network of the first communications standard; and receiving, by the network device, feedback information sent by the terminal device based on the indication information, where the feedback information is used to feed back that the terminal device has a capability of reporting a suspension notification message to the network device before leaving the network of the first communications standard.

Optionally, the first indication information may be carried in a system information block SIB1 message.

According to the communication method provided in the present disclosure, the network device and the terminal device learn, through signaling interaction, that the peer end has the capability of recognizing a suspension notification message, so that the network device can, according to the suspension notification message sent by the terminal device, suspend sending scheduling information to the terminal device and suspend detecting measurement information sent by the terminal device. This can save scheduling resources and avoid detection of an incorrect measurement quantity.

According to a second aspect, the present disclosure provides a communication method, where the communication method includes:

sending, by a terminal device, a suspension notification message to a network device of a first communications standard, where the suspension notification message is used to notify that the terminal device is to leave a network of the first communications standard to listen to a network of a second communications standard, the network of the first communications standard carries data services, and the network of the second communications standard carries voice services; and leaving, by the terminal device, the network of the first communications standard after sending the suspension notification message to the network device.

According to the communication method provided in the present disclosure, after sending, to the network device, the suspension notification message that is used to indicate that the terminal device is to leave the network, the terminal device leaves the network of the network device, so that the network device learns of the leaving of the terminal device, and after the terminal device leaves the network, suspends sending scheduling information to the terminal device, and suspends detecting measurement information sent by the terminal device. This can save scheduling resources, and prevent the network device from detecting an incorrect measurement quantity after the terminal device leaves the network.

With reference to the second aspect, in a first possible implementation of the second aspect, before the sending, by a terminal device, a suspension notification message to a network device of a first communications standard, the method further includes:

determining, by the terminal device, a manner of leaving the network of the first communications standard, where the manner of leaving the network of the first communications standard by the terminal device includes a periodic leaving manner or an aperiodic leaving manner; and the sending, by a terminal device, a suspension notification message to a network device of a first communications standard includes: sending, by the terminal device, the suspension notification message to the network device, where the suspension notification message carries information about the manner of leaving the network of the first communications standard by the terminal device, and the manner information is used to indicate the manner of leaving the network of the first communications standard by the terminal device.

With reference to the first possible implementation of the second aspect, in a second possible implementation of the second aspect, the aperiodic leaving manner includes a first aperiodic leaving manner or a second aperiodic leaving manner, the first aperiodic leaving manner indicates that the network device is requested to retain context information of the terminal device, and the second aperiodic leaving manner indicates that the network device is requested to release context information of the terminal device.

With reference to any one of the second aspect or the first or the second possible implementation of the second aspect, in a third possible implementation of the second aspect, before the sending, by a terminal device, a suspension notification message to a network device of a first communications standard, the method further includes: receiving, by the terminal device, indication information sent by the network device, where the indication information is used to indicate that the network device has a capability of recognizing a suspension notification message reported by any terminal device before the any terminal device leaves the network of the first communications standard; and sending, by the terminal device, feedback information to the network device based on the indication information, where the feedback information is used to feed back that the terminal device has a capability of reporting a suspension notification message to the network device before leaving the network of the first communications standard.

According to a third aspect, the present disclosure provides a network device, configured to execute the communication method in the first aspect or any possible implementation of the first aspect. Specifically, the network device includes units configured to execute the communication method in the first aspect or any possible implementation of the first aspect.

According to a fourth aspect, the present disclosure provides a terminal device, configured to execute the communication method in the second aspect or any possible implementation of the second aspect. Specifically, the terminal device includes units configured to execute the communication method in the second aspect or any possible implementation of the second aspect.

According to a fifth aspect, the present disclosure provides a network device, where the network device includes a receiver, a transmitter, a memory, a processor, and a bus system. The receiver, the transmitter, the memory, and the processor are connected by using the bus system. The memory is configured to store an instruction. The processor is configured to execute the instruction stored in the memory and control the transmitter to send a signal. When the processor executes the instruction stored in the memory, the execution enables the processor to execute the communication method in the first aspect or any possible implementation of the first aspect.

According to a sixth aspect, the present disclosure provides a terminal device, where the terminal device includes a receiver, a transmitter, a memory, a processor, and a bus system. The receiver, the transmitter, the memory, and the processor are connected by using the bus system. The memory is configured to store an instruction. The processor is configured to execute the instruction stored in the memory and control the transmitter to send a signal. When the processor executes the instruction stored in the memory, the execution enables the processor to execute the communication method in the second aspect or any possible implementation of the second aspect.

According to a seventh aspect, a computer readable medium is provided, configured to store a computer program, where the computer program includes an instruction used to execute the communication method in the first aspect or any possible implementation of the first aspect.

According to an eighth aspect, a computer readable medium is provided, configured to store a computer program, where the computer program includes an instruction used to execute the communication method in the second aspect or any possible implementation of the second aspect.

BRIEF DESCRIPTION OF THE DRAWINGS

To describe the technical solutions in the embodiments of the present disclosure more clearly, the following briefly describes the accompanying drawings required for describing the embodiments of the present disclosure.

DETAILED DESCRIPTION

The following describes the technical solutions in the embodiments of the present disclosure with reference to the accompanying drawings in the embodiments of the present disclosure.

It should be understood that a terminal device in the embodiments of the present disclosure may be a 1T2R single active terminal device. 1T2R means that a transmitter of the terminal device has one transmit antenna, and that a receiver of the terminal device has two receive antennas. Single active means that the terminal device does not support concurrent services at a same time. That is, at a specific time, the terminal device either transmits/receives a data service in an LTE network, or transmits/receives a voice service in a network carrying voice services.

It should be further understood that, when transmitting/receiving a data service in the LTE network, the 1T2R single active terminal device periodically or aperiodically leaves the LTE network, and is handed over to another network to transmit/receive a voice service. At this time, data service transmission/reception in the LTE network is suspended.

Optionally, a network carrying data services in the embodiments of the present disclosure may be, for example, the LTE network or a subsequent evolved network of LTE. This is not limited in the embodiments of the present disclosure.

Optionally, the network carrying voice services in the embodiments of the present disclosure may be, for example, a GSM network or a CDMA network. This is not limited in the embodiments of the present disclosure.

Figure 1:
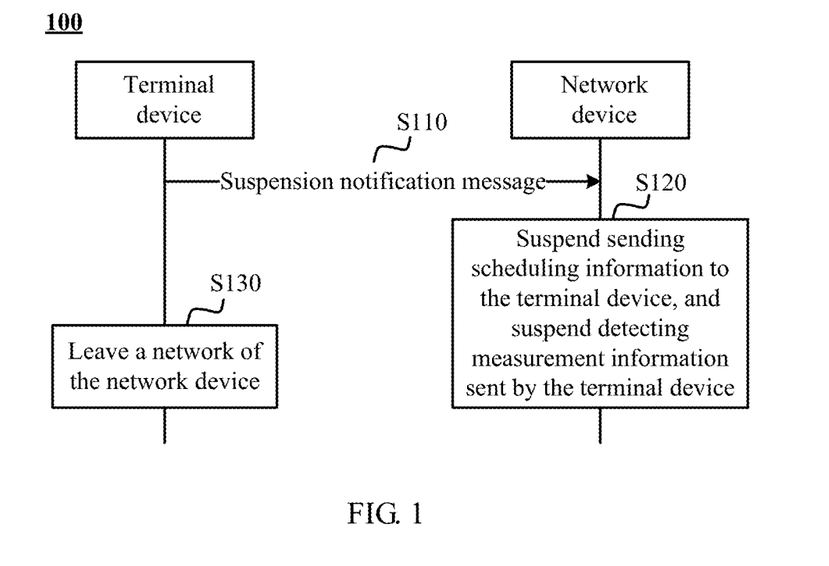
FIG. 1 is a schematic flowchart of a communication method according to an embodiment of the present disclosure.

FIG. 1 is a schematic flowchart of a communication method 100 according to an embodiment of the present disclosure. As shown in FIG. 1, the communication method 100 may be used for communication between a network device and a terminal device.

S110. The terminal device sends a suspension notification message to a network device of a first communications standard, where the suspension notification message is used to notify that the terminal device is to leave a network of the first communications standard to listen to a network of a second communications standard, the network of the first communications standard carries data services, and the network of the second communications standard carries voice services.

S120. According to the suspension notification message, the network device suspends sending scheduling information to the terminal device, and suspends detecting measurement information sent by the terminal device.

S130. After sending the suspension notification message to the network device, the terminal device leaves the network of the first communications standard.

It should be understood that there is no sequential order for execution of S120 and S130.

It should be understood that in this embodiment of the present disclosure, the network device may be, for example, a base station, and the terminal device may be, for example, a 1T2R single active mobile terminal. However, the present disclosure is not limited thereto.

According to the communication method provided in the present disclosure, after receiving the suspension notification message that is sent by the terminal device and used to indicate that the terminal device is to leave the network, the network device suspends sending scheduling information to the terminal device, and suspends detecting measurement information sent by the terminal device. This can save scheduling resources of the network device, prevent the network device from detecting an incorrect measurement quantity after the terminal device leaves the network, and therefore avoid impact on measurement accuracy because the terminal device uses the incorrect measurement quantity later after returning to the network of the first communications standard.

Specifically, in S110, the terminal device may determine a manner of leaving the network of the first communications standard. The manner of leaving the network of the first communications standard by the terminal device includes a periodic leaving manner or an aperiodic leaving manner. The terminal device may send, to the network device, the suspension notification message that carries manner information, and the manner information is used to indicate the manner of leaving the network of the first communications standard by the terminal device.

According to the communication method provided in the present disclosure, the network device uses a corresponding suspension manner, based on the manner information carried in the suspension notification message, to suspend sending scheduling information to the terminal device and suspend detecting measurement information sent by the terminal device. Therefore, the method has relatively high flexibility, and can be applied to application scenarios of different terminal device leaving manners.

It should be understood that periodically leaving, by the terminal device, the network of the first communications standard means that the terminal device periodically leaves and returns to the network of the first communications standard from a start moment and based on a specific suspension interval and suspension absence duration.

Optionally, if the manner information in the suspension notification message sent by the terminal device indicates that the manner of leaving the network of the first communications standard by the terminal device is the periodic leaving manner, the network device may, based on the manner information, periodically suspend sending scheduling information to the terminal device and periodically suspend detecting measurement information sent by the terminal device.

It should be understood that an interval at which the network device suspends sending scheduling information to the terminal device is the same as an interval at which the network device suspends detecting measurement information sent by the terminal device.

In an optional embodiment, the network device may, based on the manner information, periodically suspend sending scheduling information and detecting measurement information from a start moment agreed upon in advance with the terminal device and based on suspension duration and a suspension interval that are agreed upon in advance.

In another optional embodiment, the suspension notification message may further carry suspension start frame information, suspension interval information, and suspension duration information. The network device determines a plurality of suspension time segments based on the manner information, the start frame information, the suspension interval information, and the suspension duration information; and suspends sending scheduling information to the terminal device in the plurality of suspension time segments, and suspends, in the plurality of suspension time segments, detecting measurement information sent by the terminal device. This is not limited in the present disclosure.

Optionally, in a time segment outside the plurality of suspension time segments, the network device may resume sending scheduling information to the terminal device, and resume detecting measurement information sent by the terminal device.

It should be further understood that aperiodically leaving, by the terminal device, the network of the first communications standard means that the terminal device leaves the network of the first communications standard upon triggering of a specific voice service. The aperiodic leaving manner is divided into a first aperiodic leaving manner and a second aperiodic leaving manner. The first aperiodic leaving manner indicates that the network device is requested to retain context information of the terminal device, and the second aperiodic leaving manner indicates that the network device is requested to release context information of the terminal device.

Optionally, absence duration in the second aperiodic leaving manner is greater than absence duration in the first aperiodic leaving manner. For example, the absence duration in the first aperiodic leaving manner is less than a first threshold, and the absence duration in the second aperiodic leaving manner is greater than the first threshold. Leaving in the second aperiodic leaving manner may be, for example, leaving upon triggering of a telephony service. However, this is not limited in this embodiment of the present disclosure.

Optionally, if the manner information in the suspension notification message sent by the terminal device indicates that the manner of leaving the network of the first communications standard by the terminal device is the first aperiodic leaving manner, the network device, based on the manner information, suspends sending scheduling information to the terminal device, suspends detecting measurement information sent by the terminal device, and retains the context information of the terminal device.

Optionally, after leaving the network of the first communications standard in the first aperiodic leaving manner, to listen to the network of the second communications standard, the terminal device may further return to the network of the first communications standard and resume data service transmission/reception. The network device may further receive a first resumption notification message sent by the terminal device. The first resumption notification message is used to notify that the terminal device has returned to the network of the first communications standard. The network device may, based on the first resumption notification message, resume sending scheduling information to the terminal device, and resume detecting measurement information.

Optionally, the network device may start a timer when the terminal device leaves the network of the first communications standard in the first aperiodic leaving manner. If the timer expires, the network device may release the context information of the terminal device. This is not limited in this embodiment of the present disclosure.

Optionally, if the manner information in the suspension notification message sent by the terminal device indicates that the manner of leaving the network of the first communications standard by the terminal device is the second aperiodic leaving manner, the network device, based on the manner information, suspends sending scheduling information to the terminal device, suspends detecting measurement information sent by the terminal device, and releases the context information of the terminal device.

Optionally, after receiving the suspension notification message, the network device may send a radio resource control RRC release request message to a mobility management entity MME, and enter an idle state.

For example, the terminal device may send the suspension notification message to an L3 (Layer 3) layer of the network device; the L3 layer sends the RRC release request message to the MME; the MME sends an RRC release command to an RR of the network device; and the RR releases an RRC resource of the terminal device according to the RRC release command, and sends an RRC release complete notification to the MME.

Optionally, the terminal device may alternatively send the suspension notification message to an L2 (Layer 2) layer, and the L2 layer forwards the suspension notification message to the L3 layer. This is not limited in this embodiment of the present disclosure.

Optionally, the terminal device may enter the idle state automatically after sending the suspension notification message.

According to the communication method provided in the present disclosure, the network device learns, according to the suspension notification message sent by the terminal device, that the terminal device is to be absent from the network for a long time because of triggering of a telephony service or the like, and the network device no longer maintains the terminal device. In this way, more terminal devices in need can be connected to the network device, thereby improving network resource utilization of the network device.

It should be understood that among all terminal devices within a coverage area of the network device, some or all of the terminal devices may support a 1T2R single active function. In other words, the some or all of terminal devices have a capability of reporting a suspension notification message to the network device. The network device and the terminal devices having the 1T2R single active function within the coverage area of the network device, needs to inform the peer end in advance, through signaling interaction, that it has a capability of recognizing a suspension notification message.

Optionally, before S110, the network device may send indication information to the terminal device, where the indication information is used to indicate that the network device has a capability of recognizing a suspension notification message reported by any terminal device before the any terminal device leaves the network of the first communications standard; and the network device receives feedback information sent by the terminal device based on the indication information, where the feedback information is used to feed back that the terminal device has a capability of reporting a suspension notification message to the network device before leaving the network of the first communications standard.

Optionally, the indication information may be further used to indicate that the network device has a capability of recognizing a resumption notification message reported by any terminal device after the any terminal device returns to the network of the first communications standard. The network device may receive feedback information sent by the terminal device based on the indication information, and the feedback information is used to feed back that the terminal device has a capability of reporting a resumption notification message to the network device after returning to the network of the first communications standard.

Optionally, the indication information may be carried in a system information block (SIB) message sent by the network device to the terminal device, for example, carried in an extension field of the SIB1. Alternatively, the indication information may be sent separately. Alternatively, the indication information may be carried in other control signaling or to-be-transmitted data. This is not limited in the present disclosure.

Optionally, the network device may send the indication information to the terminal device, or may broadcast or multicast the indication information. This is not limited in the present disclosure.

According to the communication method provided in the present disclosure, the network device and the terminal device learn, through signaling interaction, that the peer end has the capability of recognizing a suspension notification message, so that the network device can, according to the suspension notification message sent by the terminal device, suspend sending scheduling information to the terminal device and suspend detecting measurement information sent by the terminal device. This can save scheduling resources and avoid detection of an incorrect measurement quantity.

Figure 2:
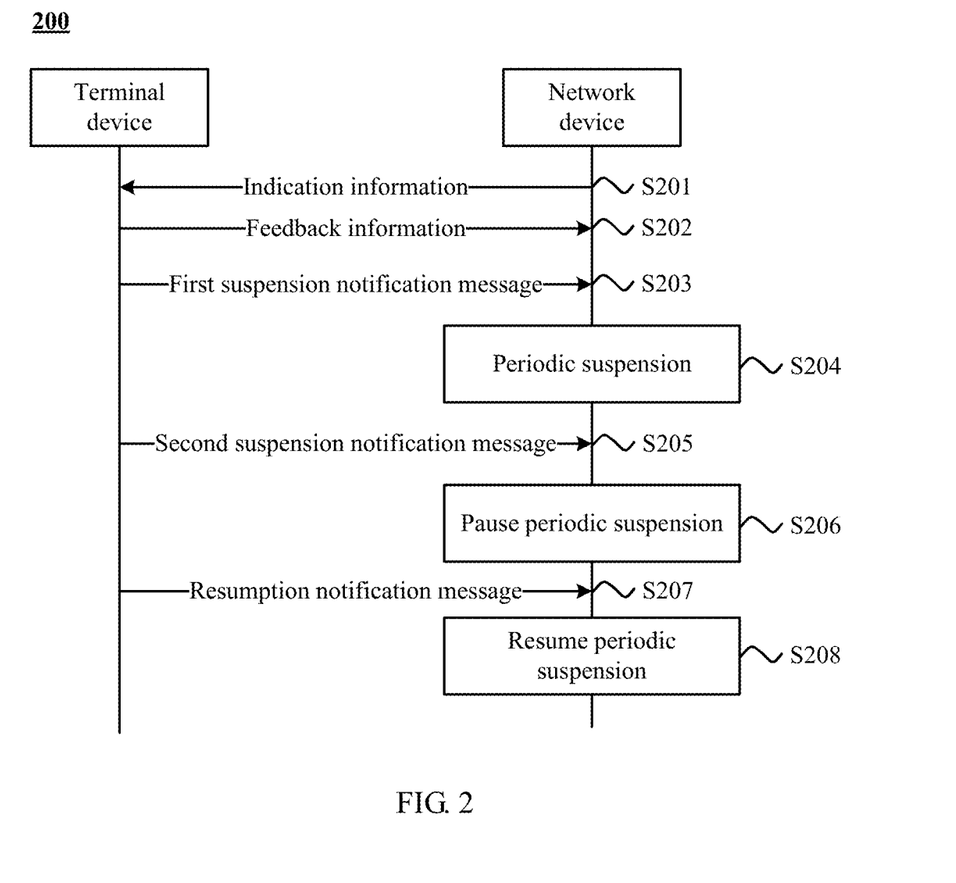
FIG. 2 is a schematic flowchart of another communication method according to an embodiment of the present disclosure.

FIG. 2 is a schematic flowchart of a communication method 200 according to an embodiment of the present disclosure. As shown in FIG. 2, the communication method 200 may be used for communication between a network device and a terminal device. The network device may be, for example, an LTE base station, and the terminal device may be, for example, a 1T2R single active mobile terminal. This is not limited in the present disclosure.

S201. The LTE base station sends indication information to the terminal device, where the indication information is used to indicate that the LTE base station has a capability of recognizing a suspension notification message reported by the terminal device before the terminal device leaves an LTE network to transmit/receive a voice service in a network of a second communications standard, the LTE network carries data services, and the network of the second communications standard carries voice services.

S202. The terminal device sends feedback information to the base station based on the indication information, where the feedback information is used to feed back that the terminal device has a capability of reporting a suspension notification message to the base station before leaving the LTE network.

S203. The terminal device sends a first suspension notification message to the base station, where the first suspension notification message is used to notify that the terminal device is to leave the LTE network in a periodic leaving manner to listen to the network of the second communications standard.

S204. Based on the first suspension notification message, the base station periodically suspends sending scheduling information to the terminal device, and periodically suspends detecting measurement information sent by the terminal device.

Optionally, after receiving the first suspension notification message, the base station may periodically suspend sending scheduling information and detecting measurement information from a start moment agreed upon in advance with the terminal device and based on suspension duration and a suspension interval that are agreed upon in advance.

Optionally, the first suspension notification message may further carry suspension start frame information, suspension interval information, and suspension duration information. The base station may determine a plurality of suspension time segments based on the manner information, the start frame information, the suspension interval information, and the suspension duration information; and in the plurality of suspension time segments, suspend sending scheduling information to the terminal device, and suspend detecting measurement information sent by the terminal device.

S205. The terminal device sends a second suspension notification message to the base station, where the second suspension notification message is used to notify that the terminal device is to leave the LTE network in a first aperiodic leaving manner to listen to the network of the second communications standard.

S206. Based on the second suspension notification message, the base station suspends sending scheduling information to the terminal device, suspends detecting measurement information sent by the terminal device, and retains context information of the terminal device; and at the same time, pauses the periodically suspending sending scheduling information to the terminal device and the periodically suspending detecting measurement information sent by the terminal device.

S207. The terminal device sends a resumption notification message to the network device, where the resumption notification message is used to notify that the terminal device has returned to the network of the network device.

S208. Based on the resumption notification message, the network device resumes the periodically suspending sending scheduling information to the terminal device and the periodically suspending detecting measurement information sent by the terminal device.

Figure 3:
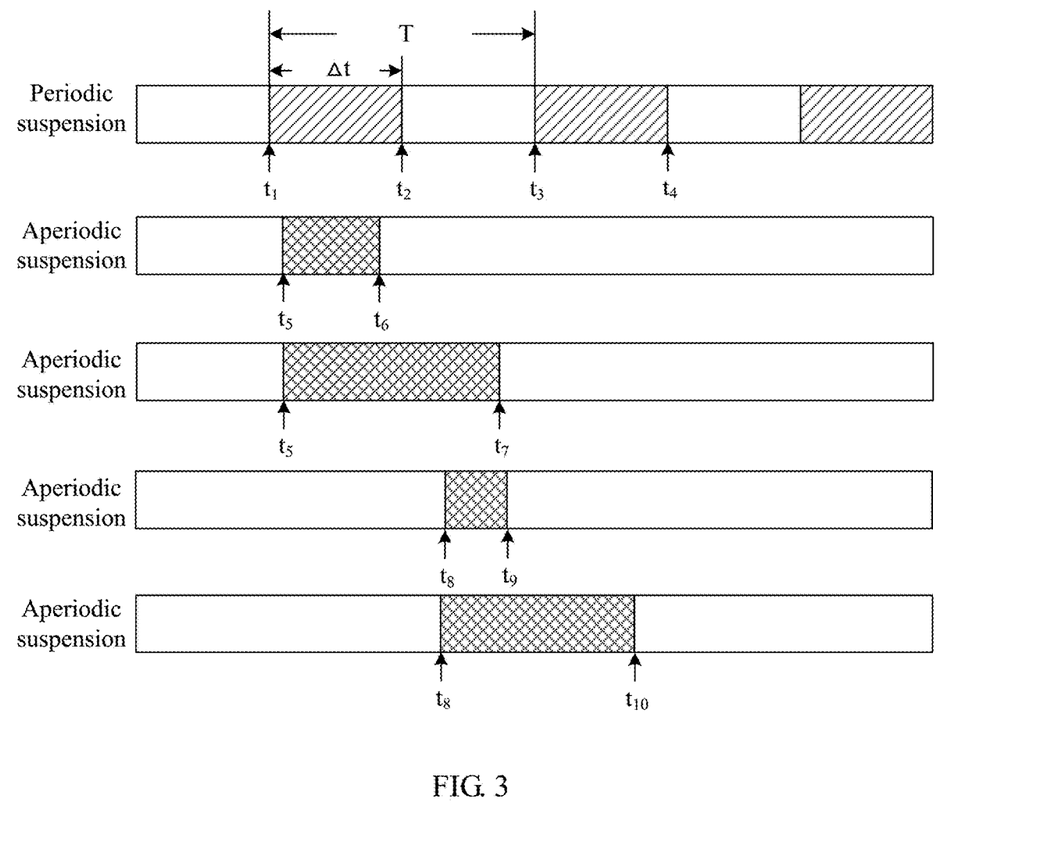
FIG. 3 is a schematic diagram of times when a network device suspends communication with a terminal device according to an embodiment of the present disclosure.

FIG. 3 is a schematic diagram of times when leaving the network in the first aperiodic leaving manner is triggered in a process in which the terminal device periodically leaves the network. As shown in FIG. 3, periodic leaving of the terminal device with a suspension interval being T and suspension duration being $\Delta t$ is triggered at a $t_1$ moment. A first suspension time segment is from the $t_1$ moment to a $t_2$ moment, a second suspension time segment is from a $t_3$ moment to a $t_4$ moment, and a time segment between the $t_2$ moment and the $t_3$ moment is a time segment in which the terminal device is present in the LTE network.

As shown in FIG. 3, if a triggering moment of the suspension in the first aperiodic manner is a $t_5$ moment, at this moment, the terminal device is being in a time segment in which the terminal device is absent from the LTE network. In this case, the LTE base station pauses maintaining the leaving of the terminal device out of periodic suspension, until the resumption notification message reported by the terminal device is received.

Optionally, if the LTE base station receives, at a $t_6$ moment, the resumption notification message reported by the terminal device, the LTE base station determines that the terminal device has returned to the LTE network, and resumes, from the $t_6$ moment, maintaining the leaving out of periodic suspension. To be specific, from the $t_6$ moment to the $t_3$ moment, the LTE base station sends scheduling information to the terminal device, and detects measurement information sent by the terminal device.

Optionally, if the LTE base station receives, at a $t_7$ moment, the resumption notification message reported by the terminal device, the LTE base station determines that the terminal device has returned to the LTE network, and resumes, from the $t_7$ moment, maintaining the leaving out of periodic suspension. To be specific, from the $t_7$ moment to the $t_3$ moment, the LTE base station sends scheduling information to the terminal device, and detects measurement information sent by the terminal device.

As shown in FIG. 3, if a triggering moment of the suspension in the first aperiodic manner is a $t_8$ moment, at this moment, the terminal device is being in a time segment in which the terminal device is present in the LTE network.

In this case, the LTE base station pauses maintaining the leaving out of periodic suspension, until the resumption notification message reported by the terminal device is received.

Optionally, if the LTE base station receives, at a $t_9$ moment, the resumption notification message reported by the terminal device, the LTE base station determines that the terminal device has returned to the LTE network, and resumes, from the $t_9$ moment, maintaining the periodic leaving. To be specific, from the $t_9$ moment to the $t_3$ moment, the LTE base station sends scheduling information to the terminal device, and detects measurement information sent by the terminal device.

Optionally, if the LTE base station receives, at a $t_{10}$ moment, the resumption notification message reported by the terminal device, the LTE base station determines that the terminal device has returned to the LTE network, and resumes, from the $t_{10}$ moment, maintaining the periodic leaving. To be specific, from the $t_{10}$ moment to a start moment of a next suspension time segment, the LTE base station sends scheduling information to the terminal device, and detects measurement information sent by the terminal device.

The communication method in the embodiments of the present disclosure has been described in detail with reference to FIG. 1 and FIG. 3. The following describes a network device and a terminal device in the embodiments of the present disclosure with reference to FIG. 4 to FIG. 7.

Figure 4:
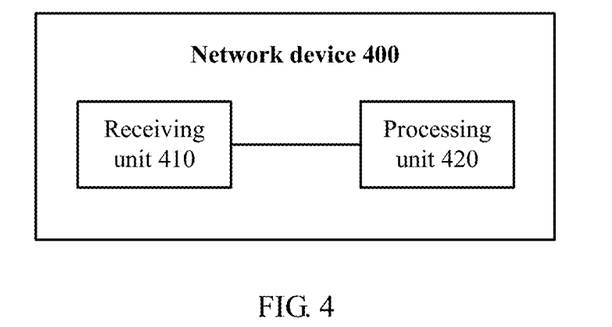
FIG. 4 is a schematic block diagram of a network device according to an embodiment of the present disclosure.

FIG. 4 shows a network device 400 according to an embodiment of the present disclosure. The network device 400 may be, for example, a base station. The network device 400 includes:

a receiving unit 410, configured for the network device of a first communications standard to receive a suspension notification message sent by a terminal device, where the suspension notification message is used to notify that the terminal device is to leave a network of the first communications standard to listen to a network of a second communications standard, the network of the first communications standard carries data services, and the network of the second communications standard carries voice services; and a processing unit 420, configured for the network device to: according to the suspension notification message received by the receiving unit 410, suspend sending scheduling information to the terminal device, and suspend detecting measurement information sent by the terminal device.

Optionally, the suspension notification message carries information about a manner of leaving the network of the first communications standard by the terminal device, and the manner information is used to indicate that the manner of leaving the network of the first communications standard by the terminal device is a periodic leaving manner or an aperiodic leaving manner. The processing unit is specifically configured for the network device to: based on the manner information, suspend sending scheduling information to the terminal device, and suspend detecting measurement information sent by the terminal device.

Optionally, if the manner information indicates that the manner of leaving the network of the first communications standard by the terminal device is the periodic leaving manner, the processing unit is specifically configured for the network device to: based on the manner information, periodically suspend sending scheduling information to the terminal device, and periodically suspend detecting measurement information sent by the terminal device.

Optionally, the suspension notification message further carries suspension start frame information, suspension interval information, and suspension duration information, and the processing unit is specifically configured for the network device to: determine a plurality of suspension time segments based on the manner information, the start frame information, the suspension interval information, and the suspension duration information; and suspend sending scheduling information to the terminal device in the plurality of suspension time segments, and suspend, in the plurality of suspension time segments, detecting measurement information sent by the terminal device.

Optionally, if the manner information indicates that the manner of leaving the network of the first communications standard by the terminal device is the aperiodic leaving manner, and is a first aperiodic leaving manner in the aperiodic leaving manner, where the first aperiodic leaving manner indicates that the network device is requested to retain context information of the terminal device, the processing unit is specifically configured for the network device to: based on the manner information, suspend sending scheduling information to the terminal device, suspend detecting measurement information sent by the terminal device, and retain the context information of the terminal device.

Optionally, if the manner information indicates that the manner of leaving the network of the first communications standard by the terminal device is the aperiodic leaving manner, and is a second aperiodic leaving manner in the aperiodic leaving manner, where the second aperiodic leaving manner indicates that the network device is requested to release context information of the terminal device, the processing unit is specifically configured for the network device to: based on the manner information, suspend sending scheduling information to the terminal device, suspend detecting measurement information sent by the terminal device, and release the context information of the terminal device.

Optionally, the network device further includes a sending unit. The sending unit is configured for the network device to broadcast indication information before the network device of the first communications standard receives the suspension notification message sent by the terminal device. The indication information is used to indicate that the network device has a capability of recognizing a suspension notification message reported by any terminal device before the any terminal device leaves the network of the first communications standard. The receiving unit is further configured for the network device to receive feedback information sent by the terminal device based on the indication information. The feedback information is used to feed back that the terminal device has a capability of reporting a suspension notification message to the network device before leaving the network of the first communications standard.

According to the communication method provided in the present disclosure, after receiving the suspension notification message that is sent by the terminal device and used to indicate that the terminal device is to leave the network, the network device suspends sending scheduling information to the terminal device, and suspends detecting measurement information sent by the terminal device. This can save scheduling resources of the network device, prevent the network device from detecting an incorrect measurement quantity after the terminal device leaves the network, and therefore avoid impact on measurement accuracy because the terminal device uses the incorrect measurement quantity later after returning to the network of the first communications standard.

It should be understood that the network device 400 herein is embodied in a form of functional units. The term "unit" herein may be an application-specific integrated circuit (ASIC), an electronic circuit, a processor (for example, a shared processor, a dedicated processor, or a group processor) and a memory that are configured to execute one or more software or firmware programs, a merged logic circuit, and/or another appropriate component supporting a described function. In an optional example, a person skilled in the art may understand that the network device 400 may be specifically the network device in the foregoing embodiments, and the network device 400 may be configured to perform the procedures and/or steps that are in the foregoing method embodiments and that are corresponding to the network device. To avoid repetition, details are not described herein again.

Figure 5:
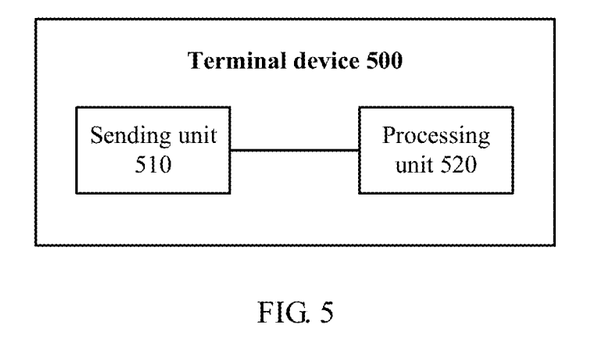
FIG. 5 is a schematic block diagram of a terminal device according to an embodiment of the present disclosure.

FIG. 5 shows a terminal device 500 according to an embodiment of the present disclosure. The terminal device 500 may be a terminal device, for example, a mobile terminal. The terminal device 500 includes:

a sending unit 510, configured for the terminal device to send a suspension notification message to a network device of a first communications standard, where the suspension notification message is used to notify that the terminal device is to leave a network of the first communications standard to listen to a network of a second communications standard, the network of the first communications standard carries data services, and the network of the second communications standard carries voice services; and a processing unit 520, configured for the terminal device to leave the network of the first communications standard after the sending unit 510 sends the suspension notification message to the network device.

Optionally, the terminal device further includes a determining unit. The determining unit is configured for the terminal device to: before the terminal device sends the suspension notification message to the network device of the first communications standard, determine a manner of leaving the network of the first communications standard. The manner of leaving the network of the first communications standard by the terminal device includes a periodic leaving manner or an aperiodic leaving manner. The sending unit is specifically configured for the terminal device to send the suspension notification message to the network device. The suspension notification message carries information about the manner of leaving the network of the first communications standard by the terminal device, and the manner information is used to indicate the manner of leaving the network of the first communications standard by the terminal device.

Optionally, the aperiodic leaving manner includes a first aperiodic leaving manner or a second aperiodic leaving manner. The first aperiodic leaving manner indicates that the network device is requested to retain context information of the terminal device, and the second aperiodic leaving manner indicates that the network device is requested to release context information of the terminal device.

Optionally, the terminal device further includes a receiving unit. The receiving unit is configured for the terminal device to: before the terminal device sends the suspension notification message to the network device of the first communications standard, receive indication information broadcast by the network device. The indication information is used to indicate that the network device has a capability of recognizing a suspension notification message reported by any terminal device before the any terminal device leaves the network of the first communications standard. The sending unit is further configured for the terminal device to send feedback information to the network device based on the indication information. The feedback information is used to feed back that the terminal device has a capability of reporting a suspension notification message to the network device before leaving the network of the first communications standard.

According to the communication method provided in the present disclosure, after sending, to the network device, the suspension notification message that is used to indicate that the terminal device is to leave the network, the terminal device leaves the network of the network device, so that the network device learns of the leaving of the terminal device, and after the terminal device leaves the network, suspends sending scheduling information to the terminal device, and suspends detecting measurement information sent by the terminal device. This can save scheduling resources, and prevent the network device from detecting an incorrect measurement quantity after the terminal device leaves the network.

It should be understood that the terminal device 500 herein is embodied in a form of functional units. The term "unit" herein may be an ASIC, an electronic circuit, a processor (for example, a shared processor, a dedicated processor, or a group processor) and a memory that are configured to execute one or more software or firmware programs, a merged logic circuit, and/or another appropriate component supporting a described function. In an optional example, a person skilled in the art may understand that the terminal device 500 may be specifically the terminal device in the foregoing embodiments, and the terminal device 500 may be configured to perform the procedures and/or steps that are in the foregoing method embodiments and that are corresponding to the terminal device. To avoid repetition, details are not described herein again.

Figure 6:
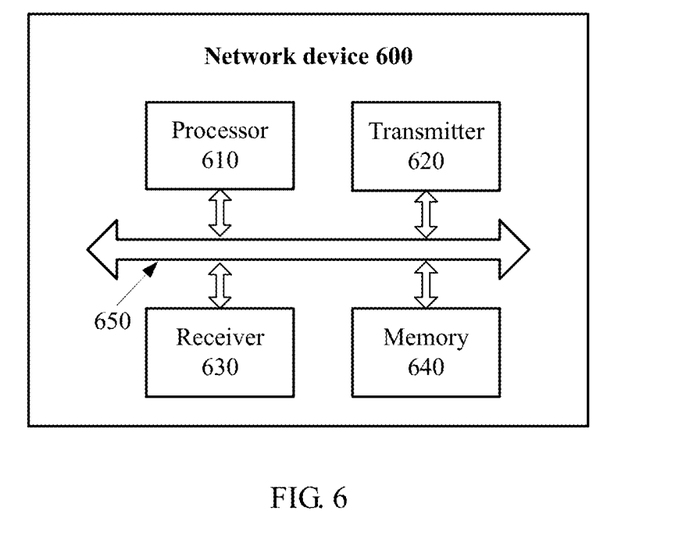
FIG. 6 is a schematic block diagram of another network device according to an embodiment of the present disclosure.

FIG. 6 shows a network device 600 according to an embodiment of the present disclosure. The network device 600 includes a processor 610, a transmitter 620, a receiver 630, a memory 640, and a bus system 650. The processor 610, the transmitter 620, the receiver 630, and the memory 640 are connected by using the bus system 650. The memory 640 is configured to store an instruction. The processor 610 is configured to execute the instruction stored in the memory 640, to control the transmitter 620 to send a signal or control the receiver 630 to receive a signal. The transmitter 620 and the receiver 630 may be communications interfaces. Specifically, the transmitter 620 may be an interface configured to receive data and/or an instruction, and the receiver 630 may be an interface configured to send data and/or an instruction. No more examples are used herein to describe specific forms of the transmitter 620 and the receiver 630.

It should be understood that the network device 600 may be configured to perform the steps and/or procedures that are in the foregoing method embodiments and that are corresponding to the network device. Optionally, the memory 640 may include a read-only memory and a random access memory, and provide an instruction and data to the processor. A part of the memory may further include a non-volatile random access memory. For example, the memory may further store device type information. The processor 610 may be configured to execute the instruction stored in the memory. When executing the instruction, the processor may perform the steps that are in the foregoing method embodiments and that are corresponding to the network device.

It should be understood that, in this embodiment of the present disclosure, the processor may be a central processing unit (CPU), or the processor may be another general purpose processor, a digital signal processor (DSP), an application-specific integrated circuit ASIC, a field programmable gate array (FPGA), another programmable logic device, a discrete gate or transistor logic device, a discrete hardware component, or the like. The general purpose processor may be a microprocessor, or the processor may be any conventional processor or the like.

Figure 7:
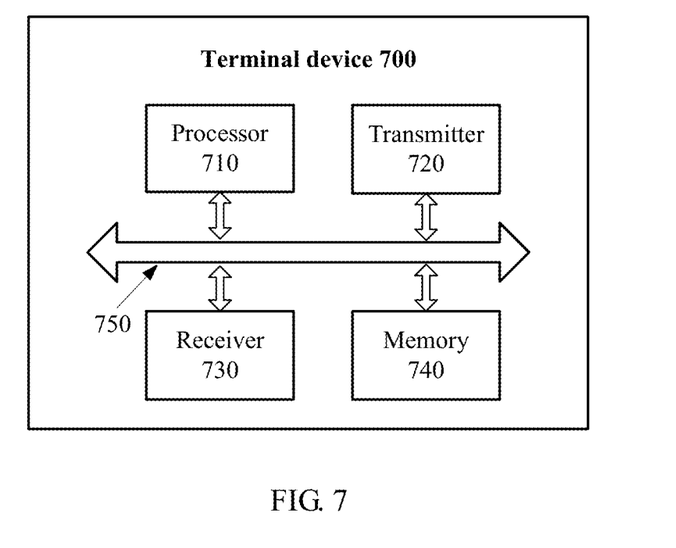
FIG. 7 is a schematic block diagram of another terminal device according to an embodiment of the present disclosure.

FIG. 7 shows a terminal device 700 according to an embodiment of the present disclosure. The terminal device 700 includes a processor 710, a transmitter 720, a receiver 730, a memory 740, and a bus system 750. The processor 710, the transmitter 720, the receiver 730, and the memory 740 are connected by using the bus system 750. The memory 740 is configured to store an instruction. The processor 710 is configured to execute the instruction stored in the memory 740, to control the transmitter 720 to send a signal or control the receiver 730 to receive a signal. The transmitter 720 and the receiver 730 may be communications interfaces. Specifically, the transmitter 720 may be an interface configured to receive data and/or an instruction, and the receiver 730 may be an interface configured to send data and/or an instruction. No more examples are used herein to describe specific forms of the transmitter 720 and the receiver 730.

It should be understood that the terminal device 700 may be specifically the terminal device in the foregoing embodiments, and may be configured to perform the steps and/or procedures that are in the foregoing method embodiments and that are corresponding to the terminal device. Optionally, the memory 740 may include a read-only memory and a random access memory, and provide an instruction and data to the processor. A part of the memory may further include a non-volatile random access memory. For example, the memory may further store device type information. The processor 710 may be configured to execute the instruction stored in the memory. When the processor executes the instruction, the processor may perform the steps that are in the foregoing method embodiments and that are corresponding to the terminal device.

It should be understood that, in this embodiment of the present disclosure, the processor may be a CPU, or the processor may be another general purpose processor, a DSP, an ASIC, an FPGA, another programmable logic device, a discrete gate or transistor logic device, a discrete hardware component, or the like. The general purpose processor may be a microprocessor, or the processor may be any conventional processor or the like.

In an implementation process, the steps in the foregoing methods may be implemented by using a hardware integrated logic circuit in the processor, or by using instructions in a form of software. The steps of the method disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads instructions in the memory and completes the steps in the foregoing methods in combination with hardware of the processor. To avoid repetition, details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be electrical, mechanical, or other forms of connections.

The units described as separate parts may or may not be physically separate. Parts displayed as units may or may not be physical units, and may be located in one position or be distributed on a plurality of network units. Some or all of the units may be selected depending on actual needs to achieve the objectives of the solutions of the embodiments of the present disclosure.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
   receiving, by a network device of a first communications standard, a suspension notification message sent by a terminal device, the suspension notification message notifies the network device that the terminal device is to leave a network of the first communications standard and further notifies the network device to listen to a network of a second communications standard, wherein the network of the first communications standard carries data services and the network of the second communications standard carries voice services; and
   suspending, by the network device according to the suspension notification message, transmission of scheduling information to the terminal device, and suspending detection of measurement information sent by the terminal device.

2. The communication method according to claim 1, wherein:
   the suspension notification message carries manner information about a manner of leaving the network of the first communications standard by the terminal device, and the manner information indicates that the manner of leaving the network of the first communications standard by the terminal device is a periodic leaving manner or an aperiodic leaving manner; and wherein the suspending is based on the manner information.

3. The communication method according to claim 2, wherein when the manner information indicates that the manner of leaving the network of the first communications standard by the terminal device is the periodic leaving manner, the suspending comprises:

periodically suspending, by the network device based on the manner information, the transmission of the scheduling information to the terminal device, and periodically suspending the detection of the measurement information sent by the terminal device.

4. The communication method according to claim 3, wherein:

the suspension notification message further carries suspension start frame information, suspension interval information, and suspension duration information; and periodically suspending, by the network device based on the manner information, the transmission of the scheduling information to the terminal device, and periodically suspending the detection of the measurement information sent by the terminal device comprises:

determining, by the network device, a plurality of suspension time segments based on the manner information, the start frame information, the suspension interval information, and the suspension duration information, and suspending, by the network device, the transmission of the scheduling information to the terminal device in the plurality of suspension time segments, and suspending, in the plurality of suspension time segments, the detection of the measurement information sent by the terminal device.

5. The communication method according to claim 2, wherein when the manner information indicates that the manner of leaving the network of the first communications standard by the terminal device is the aperiodic leaving manner and indicates the network device is requested to retain context information of the terminal device, suspending, by the network device based on the manner information, the transmission of the scheduling information to the terminal device, and suspending the detection of the measurement information sent by the terminal device further comprises:

retaining the context information of the terminal device.

6. The communication method according to claim 2, wherein when the manner information indicates that the manner of leaving the network of the first communications standard by the terminal device is the aperiodic leaving manner and indicates that the network device is requested to release context information of the terminal device, suspending, by the network device based on the manner information, the transmission of the scheduling information to the terminal device, and suspending the detection of the measurement information sent by the terminal device further comprises:

releasing the context information of the terminal device.

7. The communication method according to claim 1, wherein before receiving the suspension notification message, the method further comprises:

sending, by the network device, indication information to the terminal device for indicating the network device has a capability of recognizing a suspension notification message reported by any terminal device before leaving the network of the first communications standard; and receiving, by the network device, feedback information sent by the terminal device based on the indication information, wherein the feedback information indicates the terminal device has a capability of reporting a suspension notification message to the network device before leaving the network of the first communications standard.

8. A communication method, comprising:

sending, by a terminal device, a suspension notification message to a network device of a first communications standard, the suspension notification message notifies the network device that the terminal device is to leave a network of the first communications standard and further notifies the network device to listen to a network of a second communications standard, wherein the network of the first communications standard carries data services and the network of the second communications standard carries voice services; and leaving, by the terminal device, the network of the first communications standard after sending the suspension notification message to the network device.

9. The communication method according to claim 8, wherein:

before sending the suspension notification message, the method further comprises:

determining, by the terminal device, a manner of leaving the network of the first communications standard, wherein the manner of leaving the network of the first communications standard by the terminal device comprises an aperiodic leaving manner, wherein the suspension notification message carries information about the manner of leaving the network of the first communications standard by the terminal device, the manner information for indicating the manner of leaving the network of the first communications standard by the terminal device.

10. The communication method according to claim 9, wherein the aperiodic leaving manner includes a first aperiodic leaving manner or a second aperiodic leaving manner, wherein the first aperiodic leaving manner indicates that the network device is requested to retain context information of the terminal device, and the second aperiodic leaving manner indicates that the network device is requested to release context information of the terminal device.

11. The communication method according to claim 8, wherein before sending the suspension notification message, the method further comprises:

receiving, by the terminal device, indication information sent by the network device, wherein the indication information indicates the network device has a capability of recognizing a suspension notification message reported by any terminal device before leaving the network of the first communications standard; and sending, by the terminal device, feedback information to the network device based on the indication information, the feedback information for indicating the terminal device has a capability of reporting a suspension notification message to the network device before leaving the network of the first communications standard.

12. The communication method according to claim 8, wherein:

before sending the suspension notification message, the method further comprises:

determining, by the terminal device, a manner of leaving the network of the first communications standard, wherein the manner of leaving the network of the first communications standard by the terminal device comprises a periodic leaving manner, wherein the suspension notification message carries information about the manner of leaving the network of the first communications standard by the terminal device, the manner information for indicating the manner of leaving the network of the first communications standard by the terminal device.

13. The communication method according to claim 12, wherein before sending the suspension notification message, the method further comprises:
   receiving, by the terminal device, indication information sent by the network device, wherein the indication information indicates the network device has a capability of recognizing a suspension notification message reported by any terminal device before leaving the network of the first communications standard; and
   sending, by the terminal device, feedback information to the network device based on the indication information, the feedback information for indicating the terminal device has a capability of reporting a suspension notification message to the network device before leaving the network of the first communications standard.

14. A terminal device, comprising:
   a transmitter, configured to send a suspension notification message to a network device of a first communications standard, the suspension notification message notifying the network device that the terminal device is to leave a network of the first communications standard and the network device to listen to a network of a second communications standard, wherein the network of the first communications standard carries data services and the network of the second communications standard carries voice services;
   a memory storing program instructions; and
   a processor coupled to the memory and configured to execute the program instructions, which when executed cause the terminal device to leave the network of the first communications standard after the transmitter sends the suspension notification message to the network device.

15. The terminal device according to claim 14, wherein:
   the program instructions when executed further configured to further cause the processor to: before the transmitter sends the suspension notification message to the network device of the first communications standard, determine a manner of leaving the network of the first communications standard, wherein the manner of leaving the network of the first communications standard by the terminal device comprises an aperiodic leaving manner; and
   the transmitter is configured to: send the suspension notification message to the network device, wherein the suspension notification message carries information about the manner of leaving the network of the first communications standard by the terminal device, the manner information for indicating the manner of leaving the network of the first communications standard by the terminal device.

16. The terminal device according to claim 15, wherein the aperiodic leaving manner comprises a first aperiodic leaving manner or a second aperiodic leaving manner, the first aperiodic leaving manner for indicating that the network device is requested to retain context information of the terminal device, and the second aperiodic leaving manner for indicating that the network device is requested to release context information of the terminal device.

17. The terminal device according to claim 14, wherein the terminal device further comprises:
   a receiver configured to:
      before the terminal device sends the suspension notification message to the network device of the first communications standard, receive indication information broadcast by the network device, wherein the indication information indicates the network device has a capability of recognizing a suspension notification message reported by any terminal device before leaving the network of the first communications standard; and
   the transmitter is further configured to: send feedback information to the network device based on the indication information for indicating that the terminal device has a capability of reporting a suspension notification message to the network device before leaving the network of the first communications standard.

18. The terminal device according to claim 14, wherein:
   the program instructions when executed further configured to further cause the processor to: before the transmitter sends the suspension notification message to the network device of the first communications standard, determine a manner of leaving the network of the first communications standard, wherein the manner of leaving the network of the first communications standard by the terminal device comprises a periodic leaving manner; and
   the transmitter is configured to: send the suspension notification message to the network device, wherein the suspension notification message carries information about the manner of leaving the network of the first communications standard by the terminal device, the manner information for indicating the manner of leaving the network of the first communications standard by the terminal device.

19. The terminal device according to claim 18, wherein the terminal device further comprises:
   a receiver configured to:
      before the terminal device sends the suspension notification message to the network device of the first communications standard, receive indication information broadcast by the network device, wherein the indication information indicates the network device has a capability of recognizing a suspension notification message reported by any terminal device before leaving the network of the first communications standard; and
   the transmitter is further configured to: send feedback information to the network device based on the indication information for indicating that the terminal device has a capability of reporting a suspension notification message to the network device before leaving the network of the first communications standard.

* * * * *